United States Patent [19]

Warren

[11] 4,061,789

[45] Dec. 6, 1977

[54] PROCESS OF SIMULATING A LEAN AND FAT MEAT PRODUCT

[75] Inventor: Gregory Noel Warren, Wodonga, Australia

[73] Assignee: Uncle Ben's of Australia Pty. Ltd., Wodonga, Australia

[21] Appl. No.: 601,601

[22] Filed: Aug. 4, 1975

[30] Foreign Application Priority Data

Aug. 6, 1974 Australia ............................. 8439/74

[51] Int. Cl.$^2$ .......................... A23L 1/275; A23J 3/00
[52] U.S. Cl. .................................... 426/250; 426/656; 426/657; 426/802; 426/641; 426/335; 426/542; 426/658
[58] Field of Search ............... 426/104, 250, 656, 657, 426/802, 805, 641, 335, 542, 658

[56] References Cited

U.S. PATENT DOCUMENTS

| | | | |
|---|---|---|---|
| 3,380,832 | 4/1968 | Bone ..................................... | 426/250 |
| 3,615,656 | 10/1971 | Alden ................................... | 426/250 |
| 3,765,902 | 10/1973 | Charter ............................ | 426/104 X |
| 3,840,679 | 10/1974 | Liepa et al. ...................... | 426/802 X |

*Primary Examiner*—Raymond N. Jones
*Assistant Examiner*—Esther M. Kepplinger
*Attorney, Agent, or Firm*—Davis, Hoxie, Faithfull & Hapgood

[57] ABSTRACT

A process for producing a food product having portions simulating in color the appearance of lean meat and other portions simulating in color the appearance of fat, comprising the steps of compounding together, with heating sufficient at least to pasteurize, a first portion of food components incorporating a material imparting to the first portion a color simulating that of lean meat; compounding together, with heating sufficient at least to pasteurize, a second portion of food components incorporating a material imparting to the second portion a color simulating that of fat, at least one of said portions containing protein, thereafter cooling the said portions so as to establish, between the cooled portions, a temperature difference of 5°–25° C.; and commingling the differentially-temperatured portions at a temperature below about 50° C., whereby the colored portions are cohesive one to the other without excessive deleterious bleeding therebetween.

5 Claims, No Drawings

PROCESS OF SIMULATING A LEAN AND FAT MEAT PRODUCT

This invention relates to the field of food products — and more specifically, within that field, to processed food for animals (particularly domestic animals such as dogs and cats) and an improved process for making such foods. By the invention, there is provided a process whereby a food product having the appearance of meat (and incorporating characteristic component portions respectively simulating lean meat and fat) can be manufactured more efficaciously than heretofore. The resultant product has a soft moist texture, is stable at room temperature, has a more than adequate shelf life, and evidences an extremely satisfactory level of animal acceptance.

Animal foods having a meaty appearance, attributable to the presence or respective lean meat and fat simulating proportions, are known in the art. Generally speaking, however, prior art products have, on the score of (meat simulating) appearance, been less than satisfactory — while from the manufacturing aspect, the processes for their production have necessitated the use of equipment which, because of its lack of versatility and relative sophistication, deleteriously affected the overall economy of the operation. It is a principal object of the invention to provide a process, and resultant product, whereby the foregoing disadvantages are overcome — or at least considerably alleviated.

Broadly there is provided by the invention, a process for producing a food product, characterised by the steps of preparing, separately, at least two intermediate formulations, said formulations including at least one intended for lean meat simulation, and at least one for fat simulation; causing or permitting a temperature difference of at least 5° C to be established and/or maintained between the respective lean meat simulating and fat simulating formulations; and blending together the said differentially-temperatured formulations. In a more specific aspect, the invention provides a process for producing a food product characterised by the steps of compounding together, with heating, a series of individual ingredients so as to prepare at least one formulation corresponding to a coloured portion or portions simulating lean meat; compounding together, with heating, a series of individual ingredients so as to prepare at least one formulation corresponding to a further coloured portion or portions simulating fat, the foregoing compounding steps being carried out sequentially or simultaneously but separately; differentially cooling the thus-prepared lean meat and fat simulating formulations so as to establish, between the cooled formulations, a temperature difference of at least 5° C; blending the differentially-temperatured formulations; and cooling the resultant blend. In a still further aspect, the invention comprehends a product of meaty appearance, said product comprising a plurality of blended formulations said formulations including at least one lean meat simulating (coloured) portion and at least one fat simulating (coloured) portion, the product having a soft moist texture, and being prepared in accordance with either one of the above processes as defined.

The expression soft moist texture connotes a product having a moisture content of 15 to 50%. Within that range, 20 to 30–35% is a preferred figure.

Compared with the prior art, the present invention offers several positive advantages. Firstly the product, incorporating the lean meat and fat simulating portions, is extremely realistic in its simulation of authentic meat. Technique-wise, the process can be performed with simple, readily obtainable and inexpensive equipment — and further, as a testament to its versatility, it can be carried out either batch-wise or continuously. Further again, the process of the invention readily lends itself to the preparation and blending of more than two intermediate formulations.

Where the term "coloured portions(s)" is employed in this specification, it is usually intended to denote red portion(s) (having the appearance of lean meat) and white portion(s) (having the appearance of fat) — and in the ensuing description of preferred forms of the invention, the coloured portions are invariably designated as either red or white. However, it should be borne in mind that the term is not necessarily restricted thereto; for instance, portions evidencing specific colouring normally associated with particular types of meat (e.g. a portion having a brown liver-simulating colouration) fall within its purview.

When the individual formulations are blended under the above specified predetermined temperature differential conditions (such blending being implemented per medium of conventional extrusion and/or mincing equipment), a product is obtained which combines extremely satisfactory cohesiveness (between the meat and fat simulating coloured portions) with the avoidance of any deleterious bleeding effect (i.e. the red and white portions maintain their separate identity, like the meat and fat portions of authentic meat, and do not bleed, or infuse, into one another). At this stage, we offer no theoretical explanation — but simply point out that the temperature differential conditions of the instant invention are apparently responsible for such differences (between the lean meat simulating and fat simulating formulations) as to result in the efficacious properties indicated above.

The invention will now be described in greater detail with reference to preferred forms thereof (such preferred description terminating in specific examples). As a preface thereto, it is emphasised that such description is merely intended to illustrate the invention — and should not be construed in any limiting way.

When the formulations corresponding to the coloured portions are prepared for blending, and are blended, it is usually the lean meat simulating red portion which is at the higher temperature — the reason being that, for maximum economy of operation, the higher temperature is invariably allotted to the formulation present in the greater quantity. Proportion-wise, the blended products usually contain about 5 to 15% of the fat simulating white formulation — although it will of course be appreciated that this percentage is obviously variable in accordance with the precise simulatory effect required.

Turning to the actual respective temperatures, preferred blending ranges are 30° to 50° C for a red portion (more preferably 40° to 45° C) and 25° to 40° C for a white portion (more preferably 30° to 35° C) — with other coloured portions being of the order of the latter — it being remembered that the temperature differential of at least 5° C (usually in the range 5° to 25° C — and preferably of the order of 10° to 20° C) is maintained. Here again, in relation to temperatures, it will be appreciated that (just as the proportion of the formulations can be varied as indicated above) certain variations dependent upon formulation details are comprehended.

Overall, however, by way of brief summary in respect of this particular criterion, it has been found that, temperature-wise, the blending of the formulations of the invention can be performed with great efficiency and economy below 50° C.

From the viewpoint of its basic constituents, the final preferred product (and each intermediate formulation) may comprise a plurality of individual ingredients. Designated generically, these include meaty materials and/or proteinaceous materials of vegetable origin, carbohydrates, humectants, protein supplements, anti-mycotic agents, texturisers, emulsifiers, anti-oxidants, binders, non-toxic colouring materials, flavourings and miscellaneous additives (the last-mentioned term embracing not only nutritional supplements as vitamins and minerals, but also components which improve the appearance and/or enhance such properties as the chewability of the product). Considered more specifically, examples of such ingredients (listed in random order — and capable, in some instances, of performing more than one of the above functions) include beef tripe, beef trimmings, soya meal, soy flakes, skim milk powder, edible tallow, wheat flour, pregelatinised starch, propylene glycol, sorbitol, glycerol, potassium sorbate, sugars, salt, glycerol monostearate, propyl gallate, non-toxic red and white dyestuffs and pigment materials, gluten, soy concentrate, beef extract, bone flour, and appropriate vitamins and minerals. Preferred ranges of the foregoing (generically expressed) ingredients are meaty materials and/or proteinaceous materials of vegetable origin 30–50%; carbohydrates 10–60%; humectants 10–45%; protein supplements to 20%; anti-mycotic agents to 1%; texturisers to 20%; emulsifiers to 1%; anti-oxidants to 0.002%; binders to 10%; non-toxic colouring materials to 1% (with a preferred figure for red colourant being, more specifically, to 0.5% within that range); flavourings to 1%, and vitamins and minerals to 5% (with the vitamins, within that range, being adequately present if included in trace amounts only).

Where generalised terminology has been employed in the preceding paragraph, the purpose is to emphasise the suitability of alternatives; for example, while sucrose admirably typifies the sugars, glucose and fructose could be employed in lieu thereof. Similarly, the term "vitamins and minerals" connotes that orthodox, and conventional, supplements of this type (as vitamins A, B1, B2, B6, B12, D and E — and calcium phosphate) may be employed. Regarding the non-toxic colourants, the preferred red dyes are erythrosine, amaranth, and chocolate brown (proportioned as required, to give a shade of choice). As white colourant, titanium dioxide has been found to be eminently suitable.

With the proportion of white formulation to red formulation being variable in accordance with the effect required (but usually 5–15% as indicated above), a similar situation naturally applies in respect of the individual ingredients. The manner in which the intermediate formulations (and the final product) may be prepared from these individual ingredients will now be described.

In accordance with one preferred practice of the invention, two intermediate formulations (respectively corresponding to a red portion and a white portion) are each made by heating a mixture of the selected individual ingredients in a ribbon mixer to 100° C for 40 minutes. The first formulation (the red one) is then cooled to 40°–45° C, while the other formulation (the white one) is cooled to 30° to 35° C (it will thus be noted that a temperature differential of 5°–15° C has been established). The cooling is achieved by passing the mixed and heated formulations through a forced air cooling system using mesh or solid conveyor belts (which cooling operation may, if desired, be facilitated by extruding the product and cutting it into suitably sized pieces). Blending is effected by metering the respective intermediate formulations — in a typical proportion of white/red of 5–15%, maintained at the differential temperatures established above — into the throat of a conventional extruder or mincer. The resultant product is cooled as (and if) required, a suitable final temperature being in the range 20°–30° C (i.e. ambient temperature or thereabouts). Terminally, the product (cut as required) may be packaged in conventional polythene pouches.

To further particularise the heating and mixing operations, one may (for reasons indicated herebelow) carry out such operations in a series of 2 or 3 stages. Typically, the meaty component and humectant — which may be comprised within a first group of ingredients — may be initially compounded together at a temperature, and for a time, sufficient to effect pasturisation of the meat (e.g. 100° C for 40 minutes), the humectant, or at least a portion thereof, being incorporated because of its lubrication affording properties. In the post-initial stage(s), further group(s) of ingredients can be incorporated, the second stage being appropriate for the inclusion of dry materials not requiring as prolonged heating as the meaty component, and the third stage (which, if adopted, may simply approximate to a mixing operation of suitable duration) being appropriate for the addition of, inter alia, heat sensitive and/or volatile components (e.g. heat sensitive vitamins and flavourings of a volatile nature). Individual ingredients added at the post-initial stage(s) may include the vegetable proteinaceous material, emulsifiers, anti-oxidants, non-toxic colouring materials, anti-mycotic agents, vitamins and minerals, and binders (although some of these ingredients may well be incorporated in the initial stage). Within the individual stages, the ingredients may be introduced in any desired sequence — although, at its post-initial stage of introduction, it is preferred to incorporate the binder as the last ingredient.

Apparatus-wise, the process of the invention can be carried out with conventional equipment — for example, mincers and colloid mills, conveyor belts of the type mentioned in the foregoing description, steam jacketed mixers, Z-arm mixers and mincer/extruders — the equipment being selectable as required, and operable in accordance with the precise step to be performed. For example, the metering of the red and white portions (whereby, following cooling, they are introduced, for blending, into the throat of a conventional extruder or mincer as indicated above) may be effected per medium of variable speed augers, controlled so as to operate at selected variable speeds and thereby introduce the respective portions in the proportions required.

The invention will now be further described with reference to the foreshadowed specific examples. In these examples, each part (as tabulated in Examples 1 to 3) is by kilogram weight — and also indicates the respective individual percentage content.

EXAMPLE 1

The following formulations were separately mixed in a steam jacketed Z-arm mixer to a temperature of 100° C for 40 minutes.

|                                              | A     | B     |
| -------------------------------------------- | ----- | ----- |
| Beef tripe                                   | 27.0  | 27.0  |
| Soy flakes                                   | 3.0   | 3.0   |
| Skim milk powder                             | 5.0   | 5.0   |
| Edible tallow                                | 3.0   | 3.0   |
| Propylene glycol                             | 3.5   | 3.5   |
| Potassium sorbate                            | 0.3   | 0.3   |
| Minerals (calcium phosphate) and Vitamins (A,B,D and E) | 3.8 | 3.8 |
| Non-toxic red dyes (as mentioned heretofore) | 0.1   | —     |
| Non-toxic white pigments (as mentioned heretofore) | —   | 1.0   |
| Sucrose                                      | 24.0  | 24.0  |
| Salt                                         | 0.7   | 0.7   |
| Soya meal                                    | 12.3  | 12.3  |
| Wheat flour                                  | 17.3  | 16.4  |

The white coloured formulation (B) was then extruded through a 20mm diameter multi-holed plate, fitted to a Buffalo extruder with a barrel length of 500mm. Cut-off knives were adjusted so that the extruded length varied between 10–22mm, the purpose of cutting being to facilitate the (about to be described) step of cooling.

The extruded material was then air cooled by passing through a forced air cooling chamber. The temperature of this intermediate product was 35° C. In like fashion, the red coloured material was cooled to a temperature of 45° C by extruding and cooling as previously described.

The red and white coloured intermediate formulations were controllably metered into the throat of an identical (Buffalo) extruder, at 45° C and 35° C respectively, in the proportions of 9 parts red to one part white. The extruded product was then cooled to a temperature of 25° C, cut (to lengths as indicated above), and packaged in polythene pouches — giving a final product characterised by lean meat and fat simulating portions, and having the efficacious properties indicated above.

EXAMPLE 2

|                                              | A       | B       |
| -------------------------------------------- | ------- | ------- |
| Beef trimmings                               | 23.5    | 23.5    |
| Propylene glycol                             | 5.5     | 5.5     |
| Edible tallow                                | 4.0     | 4.0     |
| Emulsifier (glycerol monostearate)           | 0.05    | 0.05    |
| Anti-oxidant (propyl gallate)                | 0.002   | 0.002   |
| Salt                                         | 1.5     | 1.5     |
| Wheat flour                                  | 12.939  | 12.339  |
| Soya meal                                    | 8.5     | 8.5     |
| Non-toxic red dyes (as indicated heretofore) | 0.009   | —       |
| Non-toxic white pigments (as indicated heretofore) | — | 0.609   |
| Gluten                                       | 10.0    | 10.0    |
| Glucose                                      | 16.0    | 16.0    |
| Sucrose                                      | 13.0    | 13.0    |
| Vitamin (A,B,D and E) and Mineral (calcium phosphate) Supplement | 5.0 | 5.0 |

Separately, the ingredients for each formulation were heated to 100° C for 40 minutes in an agitated jacketed steam pan and cooled under conditions similar to Example 1.

The temperatures at which the intermediate formulations were blended were 45° C for the red portion and 30° C for the white, blending (in the ratio 85 parts red to 15 parts white) being controllably effected as in Example 1.

EXAMPLE 3

The following intermediate red coloured formulation was prepared:

| Beef trimmings                               | 24.6   |
| -------------------------------------------- | ------ |
| Propylene glycol                             | 4.6    |
| Edible tallow                                | 3.6    |
| Emulsifier (glycerol monostearate)           | 0.3    |
| Anti-oxidant (propyl gallate)                | 0.002  |
| Wheat flour                                  | 14.3   |
| Soya meal                                    | 6.0    |
| Non-toxic red food grade dye mixture (as indicated heretofore) | 0.008 |
| Sucrose                                      | 24.5   |
| Vitamin mix (A,B,D,E)                        | 0.010  |
| Salt                                         | 0.780  |
| Potassium sorbate                            | 0.3    |
| Bone flour                                   | 6.0    |
| Gluten                                       | 15.0   |

In accordance with the afore-described stage-wise procedure, the beef trimmings were initially comminuted using a colloid mill — whereupon the ingredients in the group "beef trimmings to red dye" (as sequentially listed in the above table) were heated at 100° C for 40 minutes (whilst continually mixing in a steam jacketed Z-arm mixer). Thereafter, the remaining ingredients were intimately dispersed throughout the formulation, by incorporating them into the mixer — and mixing for a further 5 minutes.

In accordance with the extrusion-cooling-cutting procedure of Example 1, the formulation was cooled to a temperature of 42° C — and metered (by means of an auger through a multi-holed die plate) into the throat of a conventional extruder or mincer having a barrel length of 300mm. A white mixture — as prepared for blending in Example 2 at 30° C — was similarly metered into the extruder throat, the relative speeds of the augers being controlled so as to give a red formulation to white formulation ratio of 9 to 1. The thus-metered red and white formulations (at 42° C and 30° C respectively, and in the just-recited ratio) were extruded through a multi-holed plate, cut to an appropriate length (20 to 30mm), cooled to ambient temperature, and packaged in polythene pouches.

EXAMPLE 4

The intermediate red coloured formulation from Example 2 (at 45° C) was blended with the white coloured intermediate formulation from Example 1 (at 35° C) in the proportions of 95 parts red to 5 parts white, blending being effected as in Example 1. A product of similarly satisfactory properties was obtained.

To complete the above Examples 1–4, the respective moisture content levels of the products are (sequentially) 25.0%, 20.5%, 21.5% and 20.7%.

In terminating the detailed description, it is again emphasised that, in the main, the details thereof are merely intended to be illustrative of the invention. As long as the basic criteria, as broadly defined, are observed, any matters falling therewithin, not being critical in themselves, may be varied in accordance with situational requirements.

I claim:

1. A process for producing a food product having portions simulating in colour the appearance of lean meat and other portions simulating in colour the appearance of fat, comprising the steps of compounding together, with heating sufficient at least to pasteurize, a first portion of food components incorporating a material imparting to the first portion a colour simulating that of lean meat; compounding together, with heating sufficient at least to pasteurize, a second portion of food components incorporating a material imparting to the second portion a colour simulating that of fat, at least one of said portions containing protein, thereafter cooling the said portions so as to establish, between the cooled portions, a temperature difference of 5°–25° C.; and commingling the differentially-temperatured portions at a temperature below about 50° C., whereby the coloured portions are cohesive one to the other without excessive deleterious bleeding therebetween.

2. A process as claimed in claim 1 wherein the blending of the differentially-temperatured portions is carried out at a temperature differential within the range 10° to 20° C.

3. A process as claimed in claim 1, wherein the meat simulating portions is cooled to a blending temperature of 40°–45° C., and the fat simulating portion is cooled to a blending temperature with the range 30°–35° C.

4. A process as claimed in claim 1, wherein both portions are comprised of proteinaceous materials of meat or vegetable origin, carbohydrates, humectants and non-toxic colouring materials.

5. A process as claimed in claim 4, wherein both portions also contain ingredients selected from protein supplements, anti-mycotic agents, texturisers, emulsifiers, anti-oxidants, binders, flavouring, and nutritional supplements.

* * * * *